(12) United States Patent
Reynolds et al.

(10) Patent No.: US 6,574,225 B2
(45) Date of Patent: *Jun. 3, 2003

(54) CLOCK RECOVERY IN A PACKET-BASED DATA NETWORK

(75) Inventors: John C. Reynolds, Beaverton, OR (US); Mike D. Nakamura, Portland, OR (US)

(73) Assignee: Omneon Video Networks, Sunnyvale, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/544,737

(22) Filed: Apr. 7, 2000

(65) Prior Publication Data

US 2003/0086442 A1 May 8, 2003

(51) Int. Cl.[7] .................................................. H04J 3/06
(52) U.S. Cl. .................... 370/395.62; 370/509; 370/518
(58) Field of Search ............................... 370/389, 395.1, 370/395.16, 395.64, 395.62, 419, 503, 508–510, 512, 516–518; 709/200, 201–203, 208, 209, 222, 227, 230–232, 236; 375/295, 316, 325, 326–329, 354, 356, 362, 365, 369, 370, 376

(56) References Cited

U.S. PATENT DOCUMENTS 4,811,365 A * 3/1989 Manno ........................ 370/504
5,361,261 A * 11/1994 Edem et al. ................. 341/102
5,528,513 A * 6/1996 Vaitzblit et al. ............. 709/103
5,661,665 A * 8/1997 Glass et al. ............... 348/390.1
5,909,431 A * 6/1999 Kuthyar et al. .............. 370/260
6,005,869 A * 12/1999 Sakai et al. .................. 370/452
6,134,276 A * 10/2000 Aman et al. ................. 375/326
6,148,135 A * 11/2000 Suzuki ...................... 348/423.1
6,161,138 A * 12/2000 Gross et al. ................. 370/433
6,253,207 B1 * 6/2001 Malek et al. ................ 345/629

FOREIGN PATENT DOCUMENTS

EP          0 721 288          7/1996
EP          0 971 547          1/2000

OTHER PUBLICATIONS

"Video Engineering, 3rd", McGraw–Hill Professional (1999) pp. 19–20, 67–68, 318–319, 326–327.

* cited by examiner

Primary Examiner—Hassan Kizou
Assistant Examiner—David Odland
(74) Attorney, Agent, or Firm—Blakely, Sokoloff, Taylor & Zafman LLP (57) ABSTRACT

A method for recovering clock signals includes generating a media sync signal to synchronize processing of digital media, and generating a transmission reference clock signal to define a duration of a transaction through a packet-based data network. The media sync and transmission clock signals may have different frequency and phase. The media is sent to a slave node of the network. The media sync and transmission clock signals are correlated to generate phase correlation information, and the phase correlation information is also sent to the slave node. Accordingly, a relatively low cost and reliable clock recovery technique suitable for synchronizing media streams across a packet-based data network is disclosed.

21 Claims, 7 Drawing Sheets

CLOCK RECOVERY IN A PACKET-BASED DATA NETWORK

FIELD OF THE INVENTION

This invention is generally related to clock recovery techniques for video and audio applications, and more particularly to phase and frequency synchronization across a packet-based data network that features isochronous data delivery.

BACKGROUND

An important capability required of a network for media (video and audio) applications is the ability to deliver real time or isochronous video and audio. This isochronous or "constant time" delivery ensures that the media data arrives at known, reliable and predictable, e.g. constant, time intervals. Computer data networking technologies have recently emerged as new vehicles for delivering media. One such technology is known as the High Speed Serial Bus (HSSB), defined in the Institute of Electrical & Electronics Engineers (IEEE) 1394 specification. In the HSSB network, a talker sends the audio or image data in packets, one packet per isochronous transaction. Each such transaction may last no longer than a fixed "cycle time" of 125 microseconds during which the packet, containing the audio or image data as its payload, must be delivered to a listener. This technology is referred to as a "streaming method" by the Society of Motion Picture and Television Engineers (SMPTE) for exchanging television (video and audio) program material. The HSSB with its isochronous mode of operation in which a constant rate of data transfer is guaranteed between a talker node and a listener node allows a versatile and cost effective digital media network to be built.

In addition to the ability to transmit and receive streams of video and audio in a predictable manner, a versatile media network suitable for television program production and editing also needs to synchronize the playback of the media at the listener nodes. This allows the playback of video at a remote location to be precisely controlled, so that the video will start and end at the same time in both local and remote locations of a production facility. Transporting such video content over a network built using the HSSB, however, presents a particularly difficult problem because the HSSB does not provide a versatile synchronization mechanism.

In a HSSB network, both the talker and the listener can process packets synchronously, ie. at the same frequency and phase. Each node has a crystal-controlled reference clock of 24.576 MHz and a 8 kHz cycle time reference clock. A digital cycle time counter tracks the duration of an isochronous transaction and is run by the 24.576 MHz clock. The counter is reset every 125 microseconds by the 8 kHz clock. The network has a packet exchange mechanism for synchronizing the digital cycle time counter of a number of listener nodes to that of a talker node, thus achieving both phase and frequency lock for keeping track of isochronous transactions.

Conventional professional and broadcast video defined by the SMPTE may use a 27.000 MHz video reference clock to finely synchronize the start time of each 30 millisecond video frame. However, the 24.576 MHz reference clock of the HSSB and the conventional broadcast video reference clock of 27.000 MHz have different frequencies. Also, there are not an integer number of HSSB reference clock periods in conventional metrics of broadcast video such as a frame (e.g. 30 msec) or a line (e.g. 63.5 microsec). This makes the synchronization of conventional broadcast video using the time references available in the HSSB network an exceedingly difficult circuit design and manufacturing problem.

SUMMARY

A method for recovering clock signals is disclosed. The method includes generating a media sync signal to synchronize processing of digital media, and generating a transmission reference clock signal to define a duration of a transaction through a packet-based data network. The media sync and transmission clock signals may have different frequency and phase. The media is sent to a slave node of the network. The media sync and transmission clock signals are correlated to generate phase correlation information, and the phase correlation information is also sent to the slave node. Accordingly, a relatively low cost and reliable clock recovery technique suitable for synchronizing media streams across a packet-based data network is disclosed.

BRIEF DESCRIPTION OF THE DRAWINGS

The invention is illustrated by way of example and not by way of limitation in the figures of the accompanying drawings in which like references indicate similar elements. It should be noted that references to "an" embodiment in this disclosure are not necessarily to the same embodiment, and they mean at least one.

DETAILED DESCRIPTION

Figure 1:
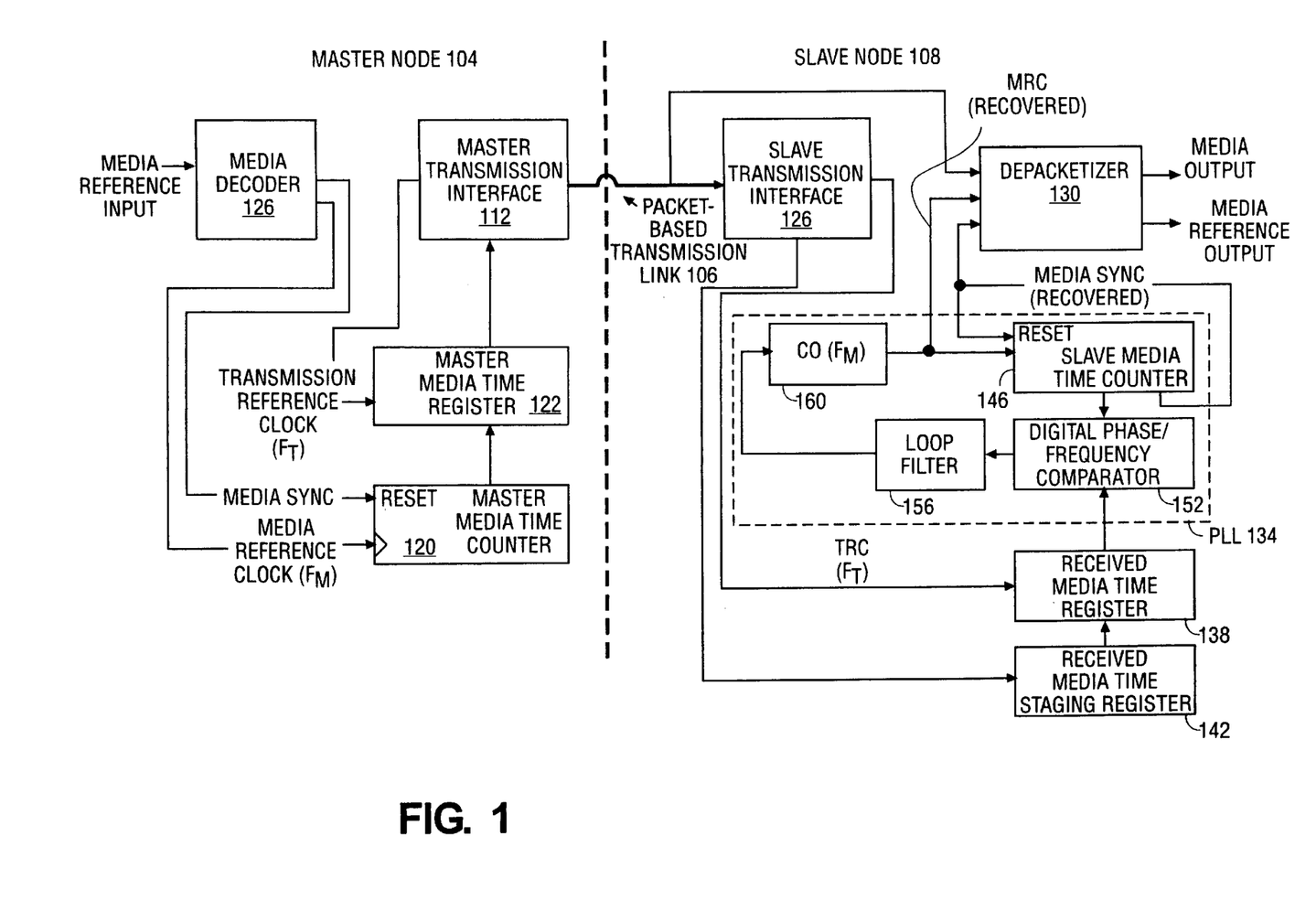
FIG. 1 illustrates a block diagram of an embodiment of a clock recovery technique in a data network.

FIG. 1 illustrates a block diagram of an embodiment of the clock recovery technique in a data network. The figure shows a master node 104 connected through a packet-based transmission link 106 to a slave node 108. Although the operation of the data network is described here using only a single slave node, the same operation can alternatively be duplicated at multiple slave nodes, each equipped similarly to slave node 108, in the data network. This may be achieved using a type of conventional multicast or broadcast mechanism, such as the one available in the HSSB protocol or other bus protocols, to allow the multiple slave nodes to listen to the master node 104. The packet-based transmission link 106 may be a four wire serial bus such as in the HSSB, or any other type of physical layer which may support packet-based transmissions, including a parallel bus, optical fiber, or a wireless link.

A master transmission interface (MTI) 112 in the master node 104 receives payload information such as digital media (audio, video, or both) and latched values of a master media time counter 120 from a master media time register 122. A media decoder 126 may be used to derive a digital media reference clock (MRC) signal having a frequency $f_M$ and a media sync clock signal. The digital MRC signal may be derived from an analog media reference input or from another type of reference input signal. For instance, the analog media reference input may be an analog black burst reference signal conventionally available in professional and broadcast video applications. If the data network is part of a television program production plant, then the media reference input may be a so-called "house black" that is distributed throughout the plant. Thus, the media reference input may take on a wide range of different signals, depending upon the application of the data network. For video applications, the media decoder 126 may be what is conventionally known as a video decoder that derives a 27.000 MHz MRC signal and a related periodic media sync signal such as frame reset from an analog or digital composite video signal. The MRC signal is used to increment or decrement the master media time counter 120, while the media sync signal is used to reset the same counter. The count value of the media time counter 120 is periodically latched in accordance with the transitions of the TRC signal.

On the slave side, a slave transmission interface (STI) 126 receives packets through the transmission link 106 and extracts payload information such as the latched value of the master media time counter 120. The slave node 108 further includes a depacketizer 130 which extracts media data from packets received through the transmission link 106. The creation of media data output by the depacketizer 130 is performed in accordance with a recovered MRC signal and a recovered media sync signal. One or more of these recovered signals is then used to provide a media reference output which, for instance, may be the analog black burst reference that was used by the media decoder 126 in the master node 104.

Both the STI and the MTI provide a synchronized transmission reference clock (TRC) signal having a frequency $f_T$. The signal may be derived, for instance, using the technique provided in the HSSB specification. In that case, a master system time counter (not shown in FIG. 1) in the MTI 112 is repeatedly updated by a system reference clock (SRC) signal running at 24.576 MHz. The master system time counter is reset every 125 microseconds which is the nominal period of the TRC signal. A slave system time counter (not shown in FIG. 1) is synchronized to the master system time counter using a packet exchange mechanism. This TRC signal ($f_T$) defines the duration of a transaction through the data network. In the HSSB, the period of the TRC signal is the maximum duration of any isochronous transaction between the master and slave nodes.

The recovered MRC and media sync signals in the slave node 108 may be derived from a phase locked loop (PLL) 134. The PLL 134 will be described in greater detail below. Generally, however, the PLL 134 serves to recover the media sync and MRC signals by comparing the received media time, stored in a received media time register 138, to a slave media time internally generated in the control loop by the combination of a controlled oscillator (CO) 160 running a slave media time counter 146. The received media time is first stored in a staging register 142 after being extracted by the STI 126. It is then adjusted and loaded into the register 138, and thereby provided to a digital phase/frequency comparator 152, in accordance with a transition of the TRC. The error or difference between the slave and received media times is fed to the main process in the control loop which includes a loop filter 156. The loop filter smoothes out the relatively rapid corrections received from the comparator 152 into a digital signal that drives the CO 160. Thus, the PLL 134 constantly attempts to maintain a lock on both phase (count value) and frequency (count update rate) of the slave media time counter 146 with respect to the master media time counter 120 in the master node 104.

Figure 2:
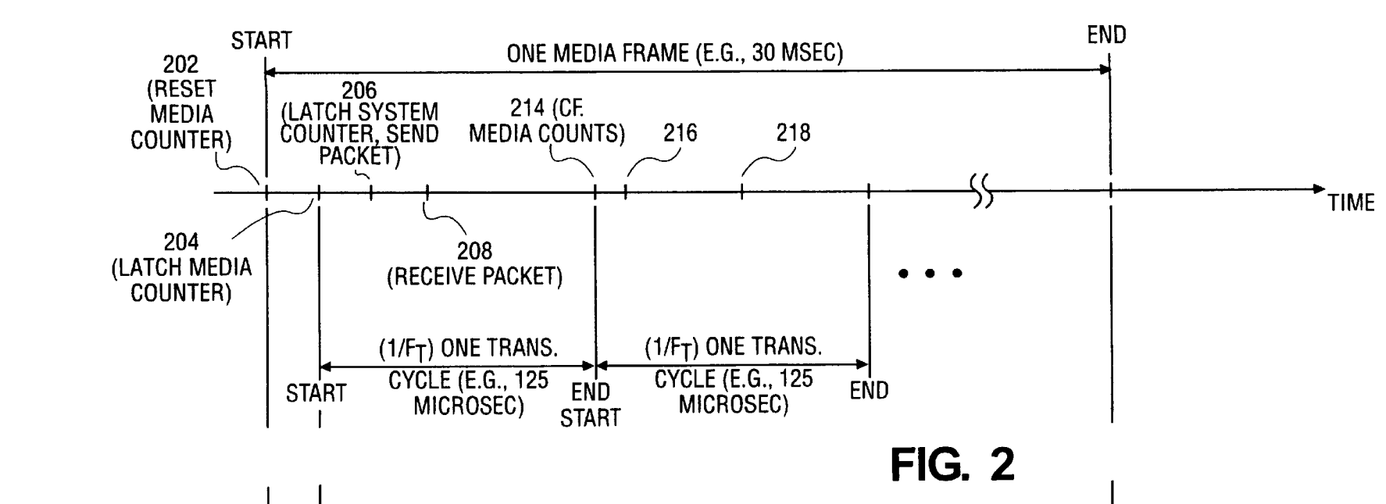
FIG. 2 shows a timeline of events in the technique of FIG. 1.

FIG. 2 illustrates a time line of events in the recovery technique of FIG. 1. Beginning with the events which occur in the master node 104, at time 202, which may be the start of a media frame such as a video frame that is 30 msec long, the master media time counter 120 is reset by a transition in the media sync signal. Although a single media frame is shown in FIG. 2, the clock recovery scheme is a process which repeats itself in accordance with the media sync signal. For the particular example of a video application, the master media time counter 120 is reset at the top of each frame of video. Operation then proceeds to time 204 when the media sync and TRC signals are correlated to generate phase information which specifies a phase relationship between the two signals. This may be done by latching a value of the media time counter 120 in accordance with the TRC signal. For the HSSB embodiment, time 204 is at the start of a transaction cycle of approximately 125 msec as shown in FIG. 2. The latched value of the media time counter 120 is stored in the media time register 122 until time 206.

Time 206 may be an arbitrary point of time essentially anywhere during the transaction cycle whose start is marked by time 204. At time 206, the current value of the master system time counter (not shown) is latched and sent by the MTI 112, together with the stored media time in register 122, preferably in a single packet, to the slave node 108. For the HSSB embodiment, the type of transaction used to send this packet, whether isochronous or asynchronous, does not matter. The packet is then received at some later time 208 by the slave node 108.

Upon receiving the correlation information sent by the master node, the STI 126 in the slave node 108 extracts the media time count value and loads the media time staging register 142 with this value. An offset is then added to the stored value to compensate for the period between time 204 and time 214 which is the start of the next transaction cycle. At time 214, the media count values in the media time register 138 and the slave media time counter in the PLL 134 are compared and the process in the PLL is updated with the new correction. A new correction to the control loop is made in this way at the start of each transaction cycle, thus ensuring that the recovered media sync and MRC ($f_M$) signals closely track, in phase and frequency, their counterparts in the master node 104.

To determine the elapsed time between time 204 and time 214 in media time space, the correlation information sent by the master node 104 includes a current value of the master system time counter (not shown) at the time 206 the packet is sent. The propagation delay of the packet through the transmission link 106 is obtained by subtracting the received master system time from the slave system time when the packet is received. Then, this difference is adjusted, either upwards or downwards, to the media time space. For instance, if the resolution of the system time space is 24.576 MHz while the media time space resolution is a 27.000 MHz clock, then the propagation delay of the packet initially obtained in system time space is scaled upwards by the ratio 27/24.576. Note that the count value that is actually fed to the PLL 134 in accordance with the TRC signal is the latched media time counter value at time 204 adjusted for (1) the arbitrary period between times 206 and 204, (2) the propagation delay between times 208 and 206, and finally (3) the "waiting" period between times 214 and 208.

Once the media sync signal and the MRC signal have been recovered in the slave node 108 as described above, the media data which is also received from the master node 104 may be played back at the slave node 108 in sync with the master node, using the recovered media sync signal.

If desired, the correlation information may be sent along with the media data as part of a single packet in each isochronous transaction although this is not critical to proper operation of the clock recovery technique. Depending on the specific application of this invention, the correlation information may be acquired and distributed through the network once per media frame or many times per media frame. If desired, correlation information may be acquired and distributed on every transaction cycle.

Figure 3:
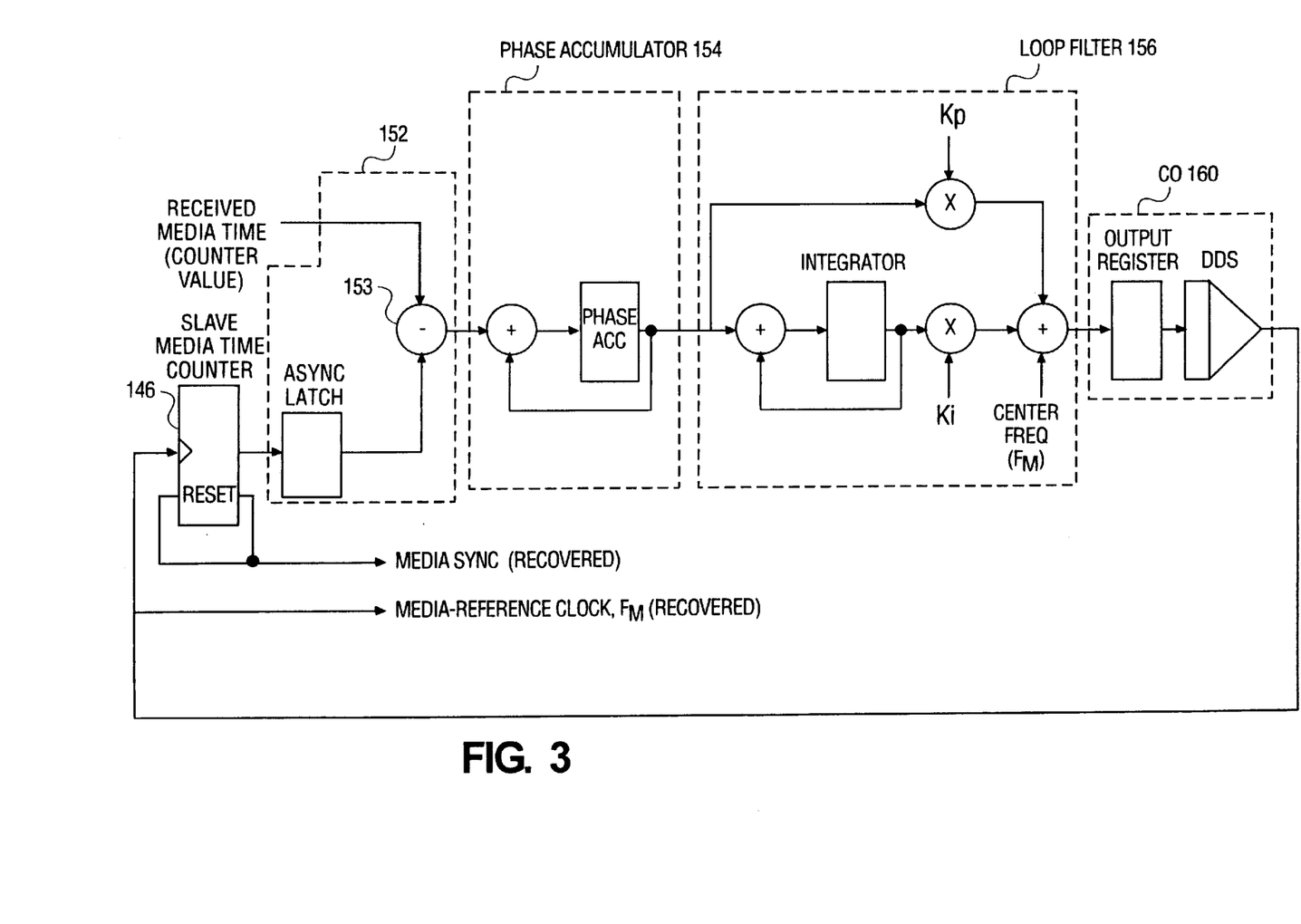
FIG. 3 depicts the data path in a phase locked loop used in the clock recovery technique of FIG. 1.

FIG. 3 illustrates the data path in an embodiment of the PLL 134. One input to the PLL is the received media time (counter value) which becomes available in the register 138 upon a transition of the TRC signal in the slave node 108 (see FIG. 1). Another input is the slave media time which is latched by the comparator 152 in accordance with the TRC in the slave node 108 (see FIG. 1). The comparator 152 may give the shortest distance to reach the received media time from the given slave media time. This distance is then a correction which may be supplied to the phase accumulator 154, if present, or directly to the input of a loop filter 156. The optional phase accumulator 154 allows multiple output calculations from the comparator 152 to be summed for providing a higher resolution correction to the loop filter 156. In the loop filter 156, the correction at the output of the digital integrator is adjusted by a scaling factor $K_i$ for the integral component whereas the output of the phase accumulator is adjusted by a scale factor $K_p$ which is the proportional factor. The proportional and integral factors are referenced to the center frequency $f_M$, and then this referenced correction is fed to the CO 160 to generate a corresponding correction in the frequency of the analog sinusoid. The CO 160 may include an output register that feeds a direct digital synthesizer (DDS) that generates a variable frequency analog output sinusoid in response to a multiple bit digital value. The correction fed to the CO 160 determines the speed at which the slave media time counter is slewed to the master media time counter. The speed of this slewing may be determined by selecting the Kp and Ki factors.

The output of the CO 160 may be fed through a clipping circuit (not shown) that turns the sinusoid into a digital square wave. This square wave, which may be deemed the recovered MRC, is then used to update the slave media time counter 146. When the control loop has been stabilized such that the corrections to the CO 160 are relatively small, the slave media time presented in the counter 146 will essentially track the master media time. For video applications, the reset frame pulse (as an embodiment of the media sync signal) may be obtained from one or more bits of the media time counter 146 as shown. To summarize, FIGS. 1, 2, and 3 illustrate the embodiment of the clock recovery technique in which the media sync signal and the TRC signal are correlated by latching a media time value generated at the master, and then sending the latched media time to the slave node where it is used to recover the media sync and MRC signals.

Figure 4:
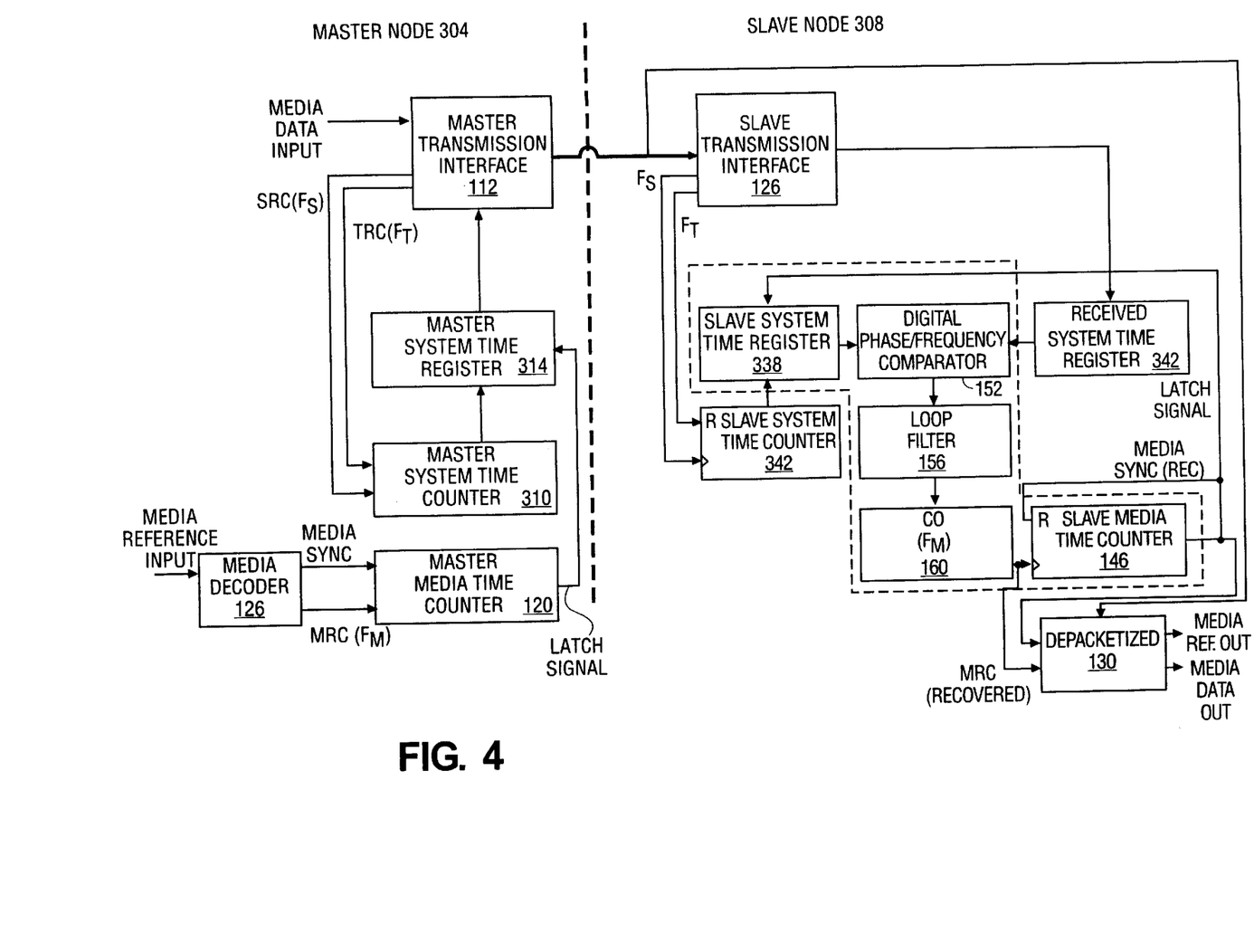
FIG. 4 illustrates a block diagram of another embodiment of the clock recovery technique.
Figure 5:
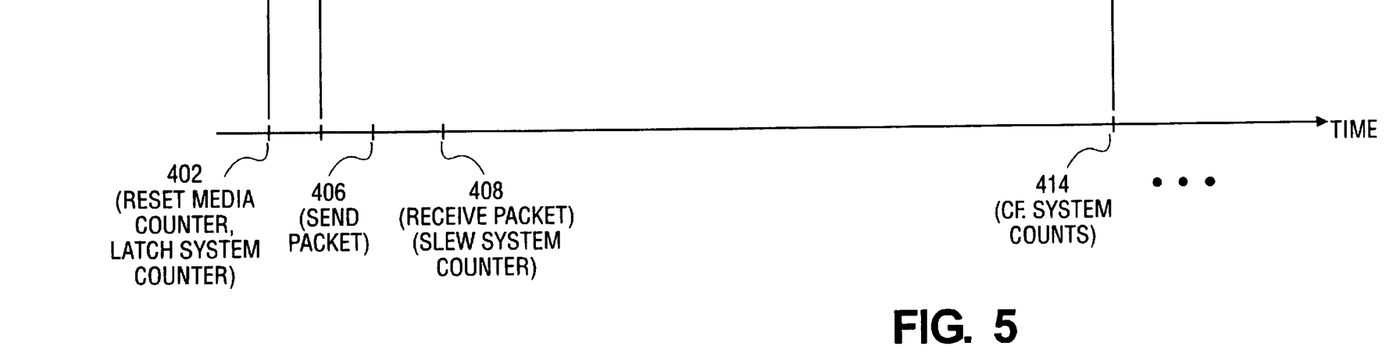
FIG. 5 shows a timeline of events in the technique of FIG. 4.
Figure 6:
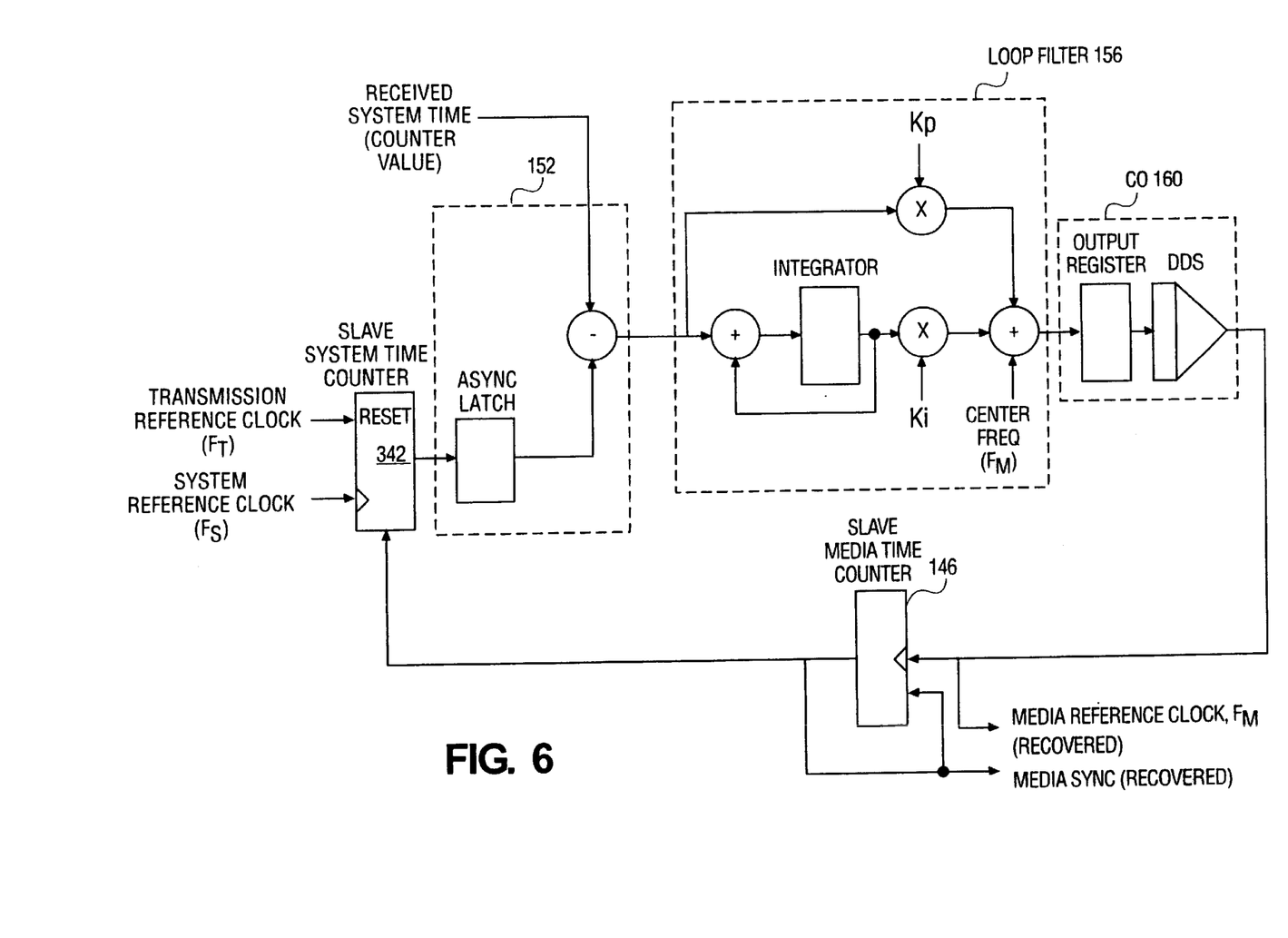
FIG. 6 depicts the data path in a phase locked loop used in the technique of FIG. 4.

FIGS. 4, 5, and 6 illustrate another embodiment of the clock recovery technique in which the media sync and TRC signals are correlated in a different manner than in the embodiment of FIG. 1. In this case, the control loop that allows the recovery of the MRC and media sync signals in the slave node compares system time count values, rather than media time count values. Essentially the same result may be achieved, however, in that the recovered MRC and media sync signals can be used to play the received media in sync with the master node.

In FIG. 4, it is shown that the master node 304 and the slave node 308 share certain components with master node 104 and slave node 108 of FIG. 1, namely MTI 112, STI 126, depacketizer 130, media decoder 126, and master media time counter 120. A master system time counter 310 (whose count is updated by a system reference clock having frequency $f_S$) plays a more prominent role in this embodiment. The counter 310 is reset according to the TRC (having frequency $f_T$.) In the HSSB embodiment, $f_S$ is precisely controlled at 24.576 MHz whereas $f_T$ is precisely controlled at 8 KHz (125 msec). The value of the system time counter 310 is latched and loaded into a master system time register 314 in accordance with a pulse derived from the media sync signal through one or more bits of the counter 120. Just as in the embodiment of FIG. 1, media sync periodically resets the master media time counter 120.

Moving to the slave node 308, a PLL 334 is shown which differs somewhat from the PLL 134 of the embodiment of FIG. 1. In the PLL 334, the correlation information received from the STI 126 includes a system time (count value) that is stored in a received system time register 342. FIG. 6 illustrates the data path through an embodiment of the PLL 334 in which the recovery of the media sync and MRC signals is achieved by comparing received system time to slave system time. Note the difference between this embodiment and that of FIG. 3, where rather than latching the current value of the slave media time counter 146 for comparison by the comparator 152, the current value of the slave system time counter 342 is latched in accordance with the recovered media sync/latch signal. The slave system time counter 342 is synchronized to the master system time counter 310 through a built-in mechanism (not shown) of the data network. This synchronization makes the master and slave nodes aware of the current time in the network. Operation of the embodiment in FIG. 4 may be described using the timeline of FIG. 5. Differences between this embodiment and that of FIG. 1 may be appreciated by comparing the timeline of FIG. 5 with that of FIG. 2.

In this embodiment, there is less correlation information transferred less frequently from the master node 304 to the slave node 308 than in the embodiment of FIG. 1. At time 402, which is the start of a media frame (the same as time 202 of FIG. 2), the master media time counter 120 is reset by the media sync signal being asserted. At approximately the same time, the value of the master system time counter 310 is latched into system time register 314. For video applications, the control signal that causes this latching may be the "top of frame" pulse which, when asserted, indicates the start of a media frame. Thereafter, at an arbitrary time during the first frame, a packet is sent to the slave node 308 that contains the latched value of the master system time counter 310. This correlation information is then received by the slave node 308 from which the STI 126 extracts the master system time. This master system time is then loaded into the received system time register 342 at time 408. Thereafter, at time 414, which may be considered to be the start of the next media frame in the sequence, the current value of the slave system time counter 342 is latched and loaded into slave system time register 338 in response to a recovered media sync signal. This recovered sync signal in FIG. 4 is derived from the output of the slave media time counter 146 which is being driven by the CO 160 having a center frequency of $f_M$. Note that the media sync/latch signal, which commands the slave system time register 338 to load the current value of the slave system time counter 342, should be derived in the same way as the latch signal which commands the master system time register 314 in the master node 304.

When the network initially starts to operate, the slave media time counter should be initialized with a value that corresponds to the elapsed time between time 408 (when the packet is received by the slave node 308) and time 402 (when the master media counter is reset.) This elapsed time may be determined by subtracting the current value of the slave system time counter 342 from the received master system time, translating the difference into media time space, and finally loading the slave media time counter with the translated value. This will immediately slew the slave media time counter 146 to the master media time counter 120 so that an accurate, initial latch signal may be available at the start of the next media frame.

At the start of the next media frame, the system time values are compared by the phase/frequency comparator 152 and a correction is sent to the CO 160 to adjust the frequency of the recovered MRC signal. When the control loop has stabilized such that the corrections sent to the CO 160 are of relatively small magnitudes, the signal at the output of the CO should be the recovered MRC whereas the latch signal should be the recovered media sync. For video applications, the latch signal derived from the slave media time counter 146 may be the top of frame pulse which is synchronized with the master node 304.

Figure 7:
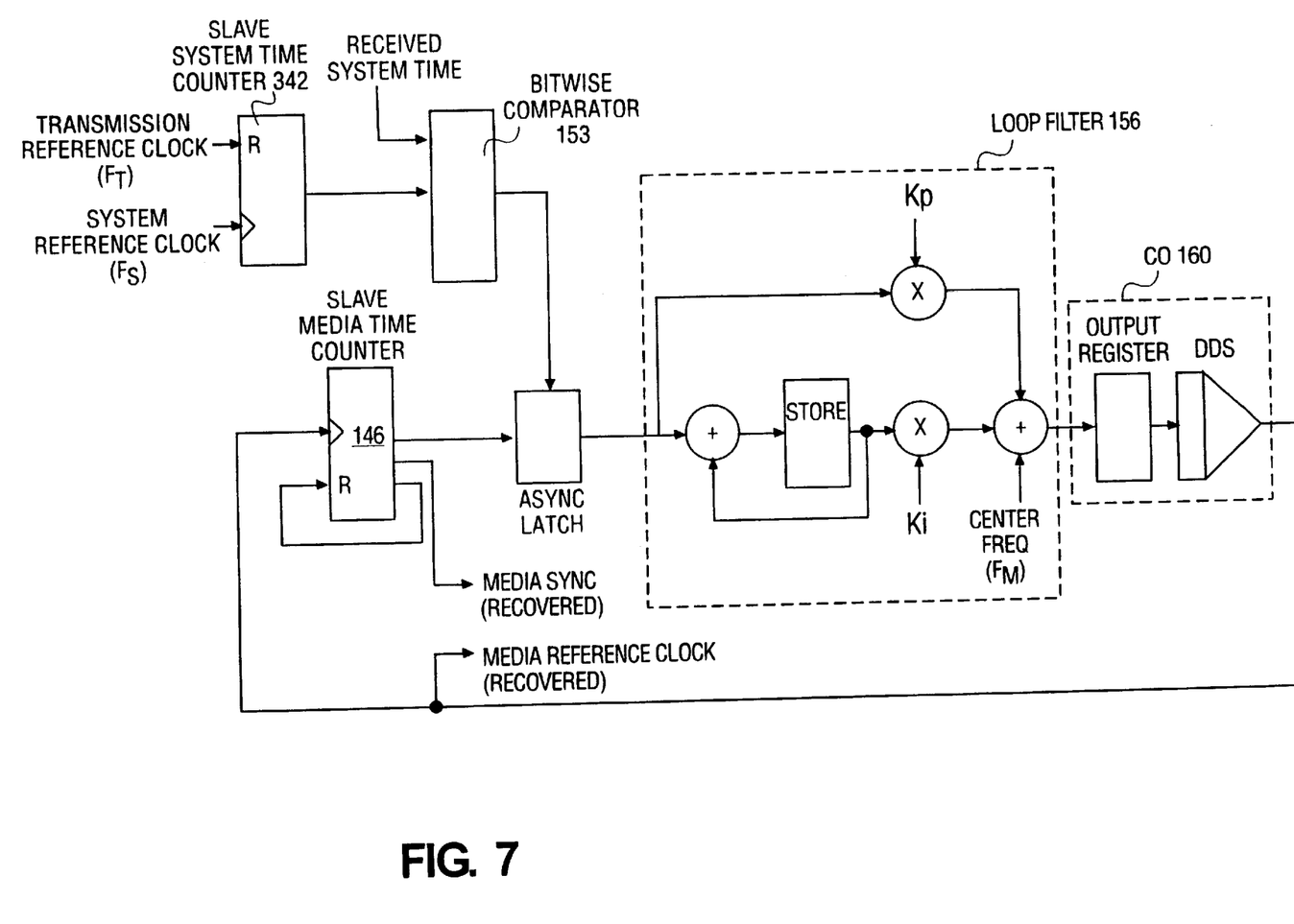
FIG. 7 depicts the data path in another phase locked loop that may be used in the clock recovery technique of FIG. 4.

FIG. 7 illustrates the data path in an embodiment of the PLL 134 which is similar to the one shown in FIG. 6, but uses a different method of comparing the desired and actual times for the media sync and MRC signals. Here, the recovery of the media sync and MRC signals is achieved by latching the instantaneous value of the received system time and the slave system time. The slave media time counter 146 is implemented such that it starts counting (at the beginning of a media frame) with its maximum negative value, reaches a count value of zero exactly half-way through the media frame, and finally reaches its maximum positive value at the end of the media frame. If the PLL is locked, the received system time counter value will match the slave system time counter when the counter 146 is exactly half-way through its count range. Thus, an error value of zero is applied to the loop filter 156. If the pulse from the bitwise comparator arrives too early, a negative value will be latched from the media time counter and applied to the filter. The net result is that the frequency of the CO 160 is automatically adjusted to match that of the MRC signal at the master node. In this embodiment, the recovered media sync signal may be decoded from one or more bits of the slave media time counter 146 such that it is coincident with the half-way point of the range in the counter 146.

There are a wide range of alternatives to several of the components described above that are used in various embodiments of the clock recovery technique. For instance, the media data output from the depacketizer 130 at the slave node 308 may be in the Serial Digital Interface (SDI) format for video. However, other formats are also possible and may be used depending upon the particular application. The MTI 112 and SDI 126 may be link layer and physical layer devices that comply with the HSSB protocol, such as those developed by Texas Instruments Corporation. Regarding the digital phase/frequency comparator 152, this component is essentially a phase and frequency detector that operates in the digital domain and accordingly may be implemented by gate array logic. As to the media decoder 126, this device may be a digital video decoder that accepts line-locked or sub carrier locked composite video, and in response produces component video including the media reference signal as well as vertical (frame reset) and horizontal sync signals. An example of such a device would be a member of the digital video decoder family produced by Fairchild Semiconductor Corporation. In general, although the various components of the master and slave nodes described above may be implemented in hard-wired logic circuitry, an alternative would be to incorporate much of the digital functionality into firmware/software, provided of course that a sufficiently speedy processor and memory system may be designed to recover the MRC and media sync signals. The feasibility of such an alternative would also depend upon the frequency of the MRC and media sync signals. It should be noted that certain elements in the master/slave transmission interfaces 112, 116 may contain analog hardware components as necessary for interfacing with the physical layer of the packet-based transmission link 106.

Figure 8:
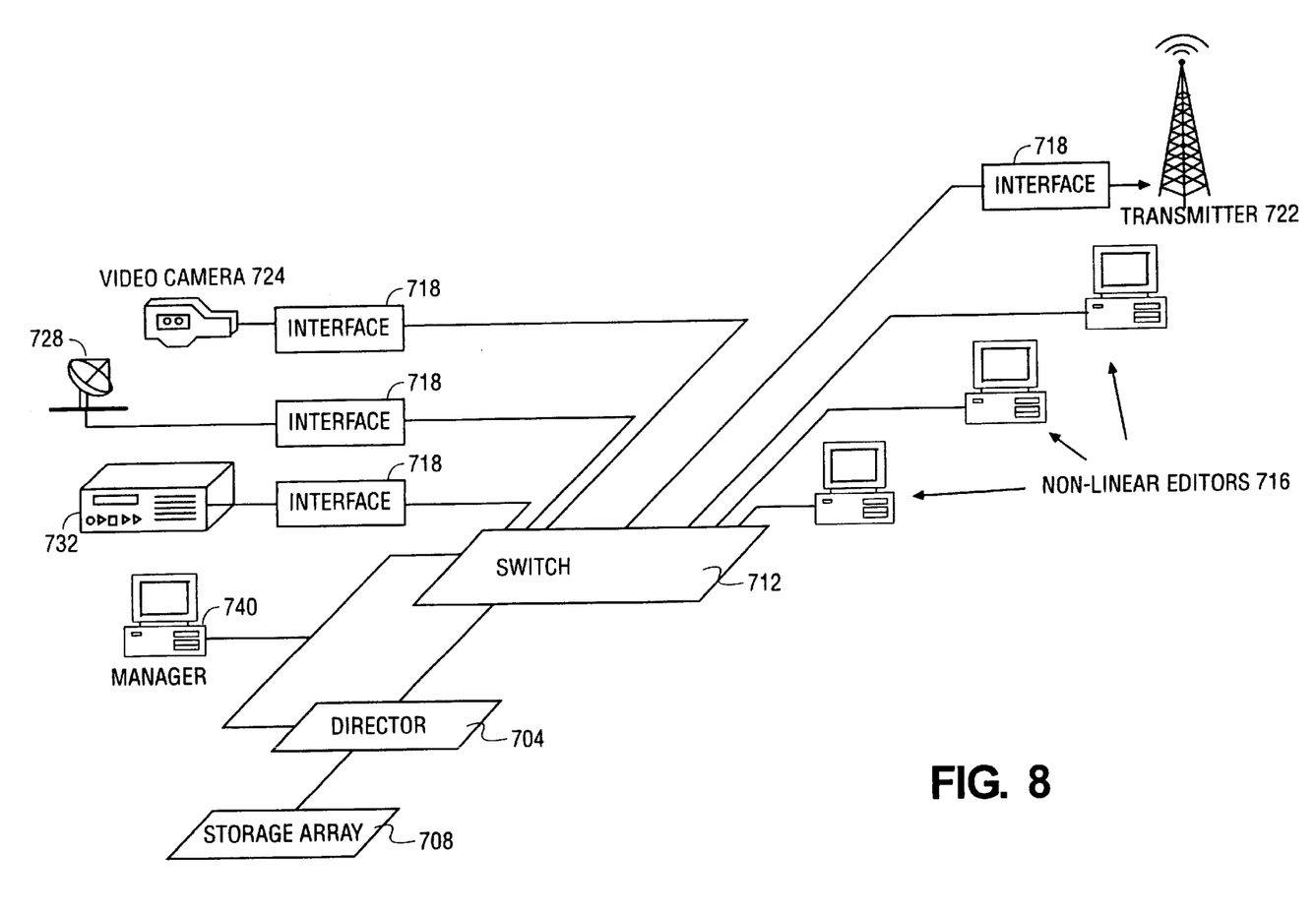
FIG. 8 is a diagram of a video application of the clock recovery technique.

FIG. 8 shows a particular application of the various embodiments of the clock recovery technique described above. What is shown is a collaborative production application which allows simultaneous access to all media files that are needed by production teams, whether producing a commercial, music video, or a newscast. Such a "video area network" includes a range of flexible components including a director 704 which is a storage array controller, distributed file system, as well as a HSSB gateway. The director manages the recording and retrieval of data to and from a storage array 708. A switch 712 being a content aware packet switch that is capable of connecting and routing HSSB data packets carrying both real time isochronous data as well as asynchronous data simultaneously. Non-linear editors 716 may be directly connected to the switch 712 via the HSSB links. Devices without native HSSB ports may connect to the network via an interface 718. The interface 718 can encode digital video and audio in various different formats. Such digital audio and video may be compressed or uncompressed. The interface 17 packetizes such data for transport over the HSSB links through the switch 712. Examples of devices which may provide and receive data through a respective interface 718 include a video tape recorder (VTR) 732, a satellite receiver 728, a video camera 724, and a transmitter station 722. Finally, a manager 740 configures and manages the entire application and ensures that specific file types are routed to the correct interface, and also provides security and access rights to material on the network. Such an application may be one that is provided by Omneon Video Networks, Inc. The various embodiments of the clock recovery technique described here may be implemented in the application by configuring the interface 718 and the video tape recorder 732 as a master node, one or more of the non-linear editors 716 as slave nodes. This would permit, for instance, the playback of a previously recorded program on the video tape recorder 732 in sync with playback of the same program on the non-linear editors 716.

Some advantages of the embodiments of the clock recovery technique may manifest themselves in video editing where a video session can be started and stopped at the slave node in sync with the same session at the master node. With respect to production type applications, the embodiments of the clock recovery technique allow multiple streams of video to be time aligned in phase, so that the display or recording can switch, at any arbitrary point in time, between any of the streams and still maintain synchronization among the streams. For instance, while a television program is playing, if a commercial needs to be inserted at a particular point in the program, then the embodiments of the clock recovery technique allow the transition from the program to the commercial to occur with no discontinuity in the video sync.

To summarize, various embodiments of the invention have been described that are directed to a clock recovery technique. In the foregoing specification, the invention has been described with reference to specific exemplary embodiments thereof. It will, however, be evident that various modifications and changes may be made thereto without departing from the broader spirit and scope of the invention as set forth in the appended claims. For instance, the clock recovery technique may be suitable for use with compressed media data provided that a media sync signal such as a frame reset signal may be associated with the decompression of the data. The specification and drawings are, accordingly, to be regarded in an illustrative rather than a restrictive sense.

What is claimed is:

1. A method comprising:

generating a media sync signal to synchronize processing of digital media;

generating a transmission reference clock signal that represents a duration of a transaction through a packet-based data network, the media sync and transmission reference clock signals having at least one of different frequency and different phase;

sending the media to a slave node of the network;

generating information about the relative phase of the media sync and transmission clock signals; and sending the phase information to the slave node.

2. The method of claim 1 further comprising:

receiving at the slave node the information sent by a master node;

recovering the media sync signal at the slave node based upon the received information;

receiving the media at the slave node; and playing the received media at the slave node using the recovered media sync signal.

3. The method of claim 1 wherein the digital media includes video, the method further comprising:

generating a media reference clock signal;

updating the count of a media time counter by the media reference clock signal; and resetting the media time counter in accordance with the media sync signal, wherein the generating of phase information includes latching a value of the media time counter in accordance with the transmission clock signal.

4. The method of claim 3 further comprising:

updating a master system time counter with a system reference clock signal, wherein the sending of the information includes sending the latched value of the media time counter and a current value of the master system time counter to the slave node.

5. The method of claim 4 further comprising:

receiving the latched value of the media time counter and the current value of the master system time counter at the slave node;

adjusting the latched value to reflect time elapsed since the latched value was obtained at the master node; and feeding the adjusted latched value to a frequency control loop in accordance with a count value of a slave system time counter which is synchronized with the master system time counter to recover the media reference clock signal and the media sync signal.

6. The method of claim 1 further comprising:

generating a system reference clock signal; and updating a system time counter by the system reference clock signal and resetting the system time counter in accordance with the transmission reference clock signal, wherein the generating of phase information includes latching a value of the system time counter in accordance with the media sync clock signal.

7. The method of claim 6 wherein the digital media includes video, the media sync signal is a video frame reset signal, and the value of the system time counter is latched at the start of each one of a plurality of frames indicated by the frame reset signal.

8. The method of claim 6 further comprising:

receiving at the slave node the information sent by a master node;

recovering the media sync signal at the slave node based upon the information;

receiving the media at the slave node; and processing the media at the slave node using the recovered media sync signal.

9. A method comprising:

receiving information from a master node through a packet-based data network about a relationship between phases of a media sync signal and a transmission reference clock signal, the media sync signal to synchronize processing of digital media, the transmission reference clock signal to indicate a duration of a transaction between the master node and a slave node through the packet-based data network;

recovering the media sync signal based upon the correlation information received from the master node;

receiving the digital media from the master node; and processing the media in the slave node using the recovered media signal.

10. The method of claim 9 wherein the receiving of the phase information includes receiving a latched value of a media time counter and a latched value of a master system time counter, the method further comprising adjusting the latched value to reflect time elapsed since the latched value was obtained at the master node, and wherein the recovering includes feeding the adjusted latched value to a frequency control loop in accordance with a count value of a slave system time counter which is synchronized with the master system time counter.

11. The method of claim 9 wherein the receiving of the phase information includes receiving a latched value of a master system time counter, and wherein the recovering includes feeding (1) the received latched value and (2) a latched value of a slave system time counter, to a frequency control loop to recover the media sync signal.

12. The method of claim 9 wherein the slave system time counter is synchronized with the master system time counter.

13. An apparatus comprising:

a first link and physical layer interface capable of sending digital media in accordance with a packet-based transmission protocol to a slave node of a network;

a first media time counter to be clocked by a media reference clock signal and reset by a media sync signal; and a first media time register to store a latched value of the first media time counter in accordance with a first transmission reference clock (TRC) signal, the first TRC signal being a measure of a duration of a transaction through the network, the interface being further coupled to the first media time register and capable of sending the latched value to the slave node.

14. The apparatus of claim 13 wherein the digital media includes video and the media sync signal is a video frame reset signal.

15. The apparatus of claim 13 wherein the first link and physical layer interface further comprises a first system time counter to be clocked by a system reference clock signal, the interface being further capable of sending a current value of the first system time counter together with the latched value of the first media time counter to the slave node.

16. The apparatus of claim 15 wherein the value of the first media time counter is latched, upon the first system time counter reaching a predetermined count.

17. The apparatus of claim 13 further comprising a second link and physical layer interface capable of receiving the digital media in accordance with the packet-based transmission protocol at the slave node;

a second media time register coupled to the second link and physical layer interface to store the latched value of the first media time counter; and a frequency control circuit to receive an adjusted latched value from the second media time register in accordance with a second TRC signal which is synchronized with the first TRC signal.

18. An apparatus comprising:

a first link and physical layer interface capable of sending digital media in accordance with a packet-based transmission protocol to a slave node of a network;

a first system time counter to be clocked by a first system reference clock signal and reset by a transmission reference clock (TRC) signal indicative of a duration of a transaction through the network; and a first system time register to store a latched value of the first system time counter in accordance with a media sync signal, the interface being further coupled to the first system time register to send the latched value to the slave node.

19. The apparatus of claim 18 wherein the digital media includes video and the media and sync signal is a video frame reset signal.

20. The apparatus of claim 19 wherein the value of the first system time counter is latched at the start of each one of a plurality of frames indicated by the frame reset signal.

21. The apparatus of claim 18 further comprising:

a second link and physical layer interface capable of receiving the digital media in accordance with the packet-based transmission protocol at the slave node; and a frequency control circuit coupled to the second interface to compare the latched value of the first system time counter to a latched value of a second system time counter which is synchronized with the first system time counter.

* * * * *